(12) United States Patent
Ackley

(10) Patent No.: US 7,722,702 B2
(45) Date of Patent: May 25, 2010

(54) ADSORBENT AND CATALYST MIXTURES

(75) Inventor: Mark William Ackley, East Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 1291 days.

(21) Appl. No.: 11/170,109

(22) Filed: Jun. 30, 2005

(65) Prior Publication Data

US 2007/0000383 A1 Jan. 4, 2007

(51) Int. Cl.
*B01D 59/26* (2006.01)

(52) U.S. Cl. .................. 95/90; 95/96; 95/101; 95/102; 95/105; 95/108

(58) Field of Classification Search ............... 95/90, 95/96, 101, 102, 105, 108, 130, 131, 121, 95/902; 423/230
See application file for complete search history.

(56) References Cited

U.S. PATENT DOCUMENTS

| | | | |
|---|---|---|---|
| 3,108,706 A | 10/1963 | Matsch et al. | |
| 3,773,690 A | 11/1973 | Heinze et al. | |
| 3,807,149 A | 4/1974 | Norback | |
| 3,969,276 A | 7/1976 | Rosback | |
| 4,019,880 A | 4/1977 | Rabo et al. | |
| 4,499,208 A | 2/1985 | Fuderer | |
| 4,544,378 A | 10/1985 | Coe et al. | |
| 4,762,537 A | 8/1988 | Fleming et al. | |
| 5,258,060 A | 11/1993 | Gaffney et al. | |
| 5,607,576 A * | 3/1997 | Yan | 208/308 |
| 6,027,548 A | 2/2000 | Ackley et al. | |
| 6,409,800 B1 | 6/2002 | Ojo et al. | |
| 6,432,170 B1 | 8/2002 | Chiang et al. | |
| 6,500,234 B1 | 12/2002 | Ackley et al. | |
| 6,572,838 B1 | 6/2003 | Sebastian et al. | |
| 6,583,081 B2 | 6/2003 | Seff et al. | |
| 6,632,766 B2 | 10/2003 | Kanazirev | |
| 6,780,806 B1 | 8/2004 | Yang et al. | |
| 2003/0163013 A1 | 8/2003 | Yang et al. | |

FOREIGN PATENT DOCUMENTS

| | | |
|---|---|---|
| DE | 19708746 | 8/1998 |
| EP | 0 170 884 A1 | 2/1986 |
| EP | 0 325 392 A2 | 7/1989 |
| EP | 0904825 * | 3/1990 |
| EP | 0 904 825 A2 | 3/1999 |

(Continued)

OTHER PUBLICATIONS

Alpay, et al. "Combined Reaction and Separation in Pressure Swing Processes," Chem. Eng. Sci. 49, 5845-5864, 1994.

(Continued)

*Primary Examiner*—Michael A Marcheschi
*Assistant Examiner*—Karla Hawkins
(74) *Attorney, Agent, or Firm*—Iurie A. Schwartz

(57) ABSTRACT

The present invention relates to the use of expensive and highly selective adsorbents and catalysts for trace contaminant gas removal to generate products of high and ultra-high purity. Mixing such highly selective materials with other less expensive, less selective materials results in the ability to achieve higher purity, higher capacity and/or lower cost without adding additional expensive selective material.

18 Claims, 3 Drawing Sheets

FOREIGN PATENT DOCUMENTS

| | | |
|---|---|---|
| EP | 1 005895 A1 | 6/2000 |
| FR | 2691375 | 11/1993 |
| FR | 2739304 | 4/1997 |
| JP | 60016801 | 1/1985 |
| JP | 61146343 | 7/1986 |
| JP | 61293548 | 12/1986 |
| WO | WO 03/101587 A1 | 12/2003 |

OTHER PUBLICATIONS

Wankat, P.C., "Large-Scale Adsorption and Chromatography," vol. 1, pp. 50-60, 1986.

Ackley, et al., "Application of Natural Zeolites in the Purification and Separation of Gases", Microporous and Mesoporous Materials, 61, 25-42, 2003.

Ruthven, "Principles of Adsorption and Adsorption Processes,", pp. 270-271, 1984.

Bolton, A.P., "Experimental Methods in Catalytic Research", Molecular Sieve Zeolites, , vol. II, ed. R.B. Anderson and P.T. Dawson, Academic Press, New York, pp. 11-13, 1976.

Calzaferri, et al., "The Electronic Structure of $Cu^+$, $Ag^+$, and $Au^+$ Zeolites," (Chem. Soc. Rev., 2003, v32, 29-37).

Bugbee, "A Textbook of Fire Assaying", Third Edition, John Wiley & Sons, New York, 1940.

Huang, Yun-Yang, "Adsorption in AgX and AgY Zeolites by Carbon Monoxide and Other Simple Molecules," Journal of Catalysis, v32; 482-491, 1974.

Schnitzlein, "Modelling Radial Dispersion in Terms of the Local Structure of Packed Beds", Chem. Eng. Sci., 56, pp. 579-585, 2001.

\* cited by examiner

ADSORBENT AND CATALYST MIXTURES

TECHNICAL FIELD

The present invention generally relates to the use of expensive and highly selective adsorbents and catalysts for trace contaminant gas removal to generate products of high and ultra-high purity. Mixing such highly selective materials with other less expensive, less selective materials results in the ability to achieve higher purity, higher capacity and/or lower cost without adding additional expensive selective material.

BACKGROUND OF THE INVENTION

Air and other gaseous feed streams to industrial processes often contain trace level contaminants that can be detrimental to the end use of the feed gas or its separated components. In addition, processes using these purified gas streams are often sensitive to even low levels of these contaminants such that the purified product stream must be of high purity or ultra-high purity (UHP). The low concentration and chemical nature of contaminants in the feed gas, coupled with the need for high purity, often require the use of highly selective adsorbent or catalyst materials for contaminant removal. While some materials can be effective, the cost associated with these highly selective materials is often quite high (e.g., >$10/lb to exceeding $100/lb). In many instances only a thin layer (e.g., several inches) of such highly selective adsorbents or catalysts is required.

Distributing highly selective and expensive materials in commercial scale vessels and maintaining a uniform layer depth of only a few inches over the entire flow area of the vessel is difficult. Variations in layer depth result in premature breakthrough of the contaminant where the layer thickness is too thin. Achieving a high or ultra-high purity product stream under such a condition may then be unreliable. When using low to moderate cost adsorbents or catalysts ($\leq$$10/lb), one solution is to increase the depth of the active layer. Adding more of an expensive material, however, may be prohibitive to the competitiveness of the process.

U.S. Pat. No. 5,258,060 to Gaffney et al. describes a bulk separation process for separation of nitrogen from air to produce oxygen. The active phase of adsorbent, with a high heat of adsorption, is diluted with an inert material in the range of 5% to 80% to reduce temperature swings and increase the effective $N_2$ working capacity.

A mixture of weak and strong adsorbents in two different types of PSA processes is disclosed in U.S. Pat. No. 6,027,548 to Ackley et al. In the bulk separation of air to produce $O_2$, both adverse thermal swing and thermal gradients are reduced by mixing adsorbents of high and low selectivity toward $N_2$.

U.S. Pat. No. 4,499,208 to Fuderer relates to activated carbon doped with inert dense alumina and a reduced thermal swing when adsorbing $CO_2$ at high pressure from a feed stream containing $H_2$, $CO_2$, CO and $CH_4$.

Mixtures of fine and course particles have been applied to reduce interparticle void space, increase adsorbent density and increase gas storage capacity. Kaplan et al. (European Application No. 0 325 392) provides an example of this methodology applied in PSA systems employing carbon molecular sieve (CMS) adsorbents for kinetic separation of air to produce $N_2$. U.S. Pat. No. 4,762,537 to Fleming et al. relates to a composite adsorbent produced by agglomerating a mixture of 50-95 wt % alumina and 5-50 wt % type Y zeolite formulated for removal of HCl present at 100 ppm or less from gas mixtures.

Heinze et al. (U.S. Pat. No. 3,773,690) discloses a binderless composite adsorbent comprising a mixture of type X and type A zeolites and the method of producing same.

A mixture of adsorbent and catalyst particles is contemplated in processes combining reaction and separation in a pressure swing reactor (PSR) (Alpay, et al. "Combined Reaction and Separation in Pressure Swing Processes," Chem. Eng. Sci. 49, 5845-5864, 1994).

Prior art techniques have been primarily aimed at bulk separation or purification of contaminants of high concentration (>1000 ppm) where the use of mixtures of adsorbents has been motivated by reducing the adverse effects of thermal swing and/or thermal gradients. Adsorption of high concentrations from a gas stream as in the prior art typically results in the formation of an equilibrium zone and a mass transfer zone (MTZ), as is well known by those of ordinary experience in the art. The saturated equilibrium zone represents a much higher capacity of contaminant than can be achieved in the MTZ. Effective processes of this type strive to achieve an overall bed or layer thickness that is several times the size of the MTZ so as to maximize the productivity of the adsorbent (Wankat, P. C., Large-Scale Adsorption and Chromatography, Vol. 1, pgs 50-60, 1986). Prior art strategies to achieve such productivity enhancement include decreasing the MTZ by using smaller adsorbent particles or increasing the overall bed length. Little attention has been given in the prior art to trace contaminant removal using thin layers containing mixtures of adsorbent or catalyst.

It would thus be desirable to provide the ability to use highly selective expensive materials in relatively thin layers for the purification of feed gas streams having low levels of contaminants to produce high and ultra-high purity (UHP) product gases.

BRIEF SUMMARY OF THE INVENTION

The present invention relates to the use of a mixture of a highly selective adsorbent or catalyst with another material to achieve higher purity and/or productivity than would be realized using the same amount of highly selective material alone. Such mixtures also extend layer depth so that relative variations in layer thickness are lessened and premature breakthrough from such variations is thereby prevented. The present invention consequently results in improved product purity and/or adsorbent or catalyst capacity.

Utilizing a mixture in accordance with the present invention to extend layer depth provides an ability to economically employ expensive advanced materials having high selectivity toward a contaminant present in trace amounts and that is difficult to remove from the feed gas stream. The use of a mixture in a given layer depth also results in a cost savings over that when the entire layer is composed only of the expensive advanced material.

In accordance with the present invention, a process for the purification of a feed gas stream containing one or more contaminants is provided such that: (a) the concentration of each contaminant to be removed from the feed gas is $\leq$1000 ppm, preferably $\leq$100 ppm, and most preferably $\leq$10 ppm; (b) the feed gas is passed through a layer containing an adsorbent or catalyst selective for removal of the contaminant wherein the layer consists of a mixture of the selective adsorbent or catalyst with another material non-selective or of low selectivity toward the contaminant; (c) the depth or thickness (dimension in the direction of the flow) of the mixed layer ($L_{ML}$) is less than or equal to the length of the mass transfer zone ($L_{MTZ}$) wherein the $L_{MTZ}$ is defined by the conditions of the process and the selective adsorbent or catalyst alone; (d)

the selective adsorbent or catalyst contains at least one element from Group VIII or Group IB of the Periodic Table; (e) the non-selective or low-selective material may be an inert porous or non-porous material or a porous catalyst or adsorbent; and (f) the removal of the contaminant results in a purified product containing the contaminant at a concentration $\leq 1$ ppm, preferably $\leq 100$ ppb ("high purity") and most preferably $\leq 10$ ppb ("ultra high purity").

The present invention is thus directed at trace contaminant purification from a feed gas stream. Such removal generally results in little or no thermal effects (i.e., nearly isothermal) and one skilled in the art would not expect thermal effects in trace contaminant removal due to the relatively low concentration of contaminants. As discussed above, the prior art has been primarily aimed at bulk separation or purification of contaminants of high concentration (>1000 ppm) where the use of mixtures of adsorbents has been motivated by reducing the adverse effects of thermal swing and or thermal gradients.

More specifically, the present invention is aimed at processes where the layer may be designed with essentially no equilibrium zone, i.e. $L_{Bed} \leq L_{MTZ}$, such that little or no part of the layer becomes saturated over the duration of the contaminant removal step. Moreover, establishing an equilibrium zone by lengthening the layer is cost-prohibitive. Although the use of a mixture in the present invention was first motivated by the need to increase the layer depth to compensate for practical limitations of loading adsorbent in large area vessels and to control variations in layer depth, it was unexpectedly discovered that mixing an active adsorbent or catalyst with a relatively inactive material actually resulted in an increase in the overall productivity of the active material with such improvement being essentially unrelated to the mitigation of any thermal effects. In addition, it was also discovered that a mixture is capable of producing a higher purity product for a given amount of selective material and given removal step time. Furthermore, using a mixture to achieve a thicker layer may actually result in an increase in the length of the mass transfer zone. The resultant increase in overall capacity of the mixture for the contaminant for a layer length equal to or less than the MTZ is counter to prior art teachings to reduce the $L_{MTZ}$ and its fraction of the overall bed in order to improve adsorbent productivity.

The performance benefits of mixing an expensive selective adsorbent with an inexpensive adsorbent, having little or no capacity for the contaminant of interest, can be captured to fulfill different objectives. For example and while not intended to be construed as limiting, such performance benefits can include: for a given product purity, a mixture containing a given amount of selective adsorbent can be employed to increase contaminant holding capacity, thus extending the available process cycle time. In addition, a mixture containing a given amount of selective adsorbent can be employed to achieve a higher purity product for a given process cycle time. Moreover, a mixture can be employed to reduce the amount of expensive adsorbent required for a given layer thickness and product purity.

BRIEF DESCRIPTION OF THE DRAWINGS

For a more complete understanding of the present invention and the advantages thereof, reference should be made to the following Detailed Description taken in conjunction with the accompanying drawings in which.

DETAILED DESCRIPTION

Figure 1:
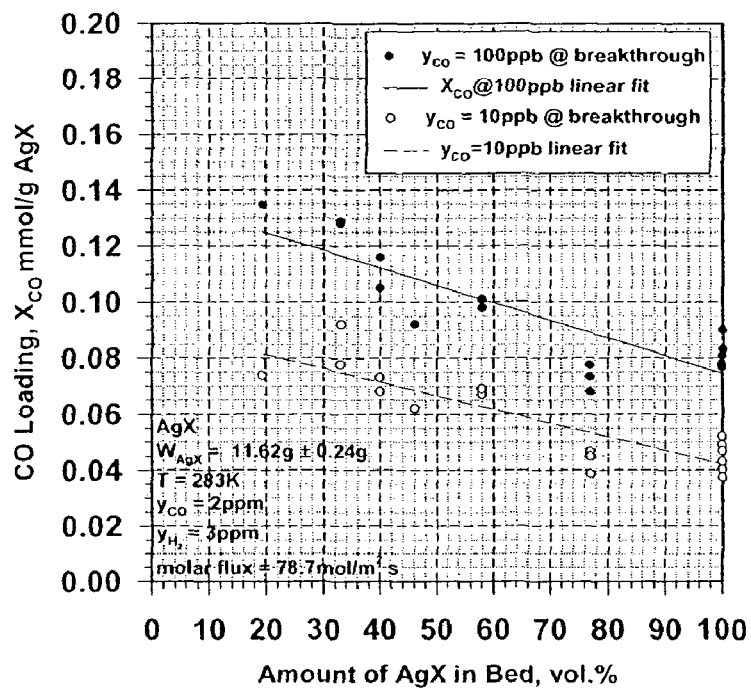
FIG. 1 illustrates the CO working capacity ($\Delta X_{CO}$) as a function of the fraction of CO-selective adsorbent (AgX) in the mixtures of Example 2.

As discussed hereinabove, the present invention relates to the purification of a gas stream by removal of contaminants present in trace amounts in the feed gas stream. The purification processes of the present invention are to be distinguished from bulk separation processes where at least one major constituent in a gas stream is removed by adsorption, catalysis or by other means, e.g. separation of air to produce $O_2$ using a $N_2$-selective adsorbent.

While the division between purification and bulk separation is not always precisely defined, removing a component from a gas stream, where that component is present in a concentration greater than a few percent (e.g. 1 vol % to about 3 vol %) is often considered a bulk separation process. For purposes of the present invention, "purification" means the removal of any undesirable component or contaminant from a gas stream in which such component(s) is present in the gas stream at a concentration of 1000 ppm or less. The invention is most effective when removing trace contaminant(s) from a feed gas stream, where such trace contaminant(s) concentrations are 100 ppm or less, and most preferably 10 ppm or less. It will be appreciated by those skilled in the art that many industrial processes use both bulk separation and purification. The present invention can be used in the trace contaminant removal purification of these processes.

The present invention further applies to the production of purified product streams of purity $\leq 1$ ppm, high purity (i.e., $\leq 100$ ppb) and ultra-high purity (i.e., $\leq 10$ ppb). The range for the concentration ratio (the ratio of contaminant concentration in a gas stream to be purified to that in the product gas) may vary from 10 to $10^5$ or greater. In other words, the requirement for reduction of the contaminant concentration in a gas stream may be as demanding as a factor of 100,000 or more for ultra-high purity products. Such high purity obtained by trace gas purification typically requires thermal regeneration of the adsorbent (e.g. thermal swing adsorption (TSA)) or catalyst, although pressure swing (PSA), vacuum swing (VSA) or combinations of these may also be effective regenerative means.

Industrial catalytic processes generally convert one or more components in a feed stream to one or more products. Such processes are actually bulk conversion processes, not separation processes. Nevertheless, catalytic processes have also been successfully employed in trace gas removal by conversion of the contaminant to a compound that may be subsequently and more easily removed by adsorption, e.g. oxidation of $H_2$ to $H_2O$ or oxidation of CO to $CO_2$.

In trace gas purification as provided by the present invention, the adsorbent or catalyst material must have a sufficiently high affinity or conversion capability for the contaminant, as well as a sufficient contaminant removal capacity. Affinity or strength of adsorption has been traditionally characterized by various definitions of selectivity. The intent of a selectivity parameter is to distinguish one adsorbent from another in terms of its ability to adsorb a desired component relative to one or more interfering component(s) in the gas mixture. In the case where physical adsorption dominates, the interfering effects are often due to coadsorption of other component(s) (usually major constituent(s) in the gas mixture).

In addition to the removal of trace components by physisorption, the present invention may also incorporate chemisorption (e.g. removal of CO by n-complexation) and catalytic (e.g. oxidation and/or reduction) removal mechanisms. The ability of an adsorbent to function effectively in the presence of large differences in the concentrations of constituents in the feed gas, e.g. adsorption of 2.0 ppm CO in the presence of 800,000 ppm $N_2$ in air, can be strongly influenced by the coadsorption of the major component. When determining selectivity ($\alpha$) of an adsorbent for a trace component relative to a major component of the feed gas mixture, the extremely large difference in concentrations often result in values of $\alpha \ll 1$ (Ackley, et al., Microporous and Mesoporous Materials 61, 25-42, 2003, the contents of which are incorporated herein by reference). It is has also been shown that the working selectivity and working capacity follow similar trends in trace gas removal such that working capacity alone may be used to evaluate the relative performance of materials and/or their different configurations.

Working capacity of an adsorbent in trace gas removal is usually low in comparison to that resulting from bulk gas separation or purification at the higher concentrations (partial pressures) of the contaminants. Nevertheless, working capacity can vary considerably in trace gas removal, i.e. from essentially zero to large enough to satisfy the performance and economic requirements of contaminant removal in the process of interest. For these reasons, working capacity and/or breakthrough time are selected as the best parameters for comparing the performance of individual materials and their mixtures in the present invention.

It is understood that at least one of the constituents in the solid mixtures described in the present invention has an affinity sufficient to adsorb, or an ability to convert, a desired trace contaminant in the mixed gas stream of interest. Such an affinity or conversion effectiveness will also be termed within this invention to be "selective" for such trace contaminant. When it is desired to produce high or ultra high purity product, highly selective solid materials may be required. A highly selective material with an associated sufficient working capacity for the contaminant(s) of interest often results in a thin removal layer containing the material with such layer having a depth or length (dimension in the direction of the bulk flow through the layer) less than or equal to the length of the mass transfer zone. The mass transfer zone is defined by the combined process conditions, product purity requirement and equilibrium and kinetic characteristics of the "highly selective" material. The mass transfer zone can be identified readily by measuring the contaminant gas concentration along the bed length at the end of the purification step.

If the bed inlet has not reached the adsorbent equilibrium capacity for the contaminant at the end of the contaminant removal step (e.g. as in very short beds) or if there is no region of constant contaminant concentration near the bed inlet, then clearly the bed contains only a MTZ and $L_{Bed} \leq L_{MTZ}$. Alternatively, the mass transfer zone length can be determined from a breakthrough test using a bed length sufficiently larger than the $L_{MTZ}$, e.g. $L_{Bed} \geq 1.1 \, L_{MTZ}$, so that at least a small, but distinguishable, equilibrium zone has formed near the bed inlet at the time the concentration front breaks through the bed outlet at the predetermined breakthrough concentration.

"Less selective" materials (or "non highly selective") are those that would not meet the above conditions relative to performance, economic or practical requirements. "Less selective" materials, for example, may exhibit an immediate breakthrough of the contaminant or require unacceptably large bed depth to achieve a desired purification step time. Exemplary less selective materials include, but are not limited to, inert particles such as glass or ceramic (e.g. glass beads) and adsorbents deemed relatively ineffective in achieving desired contaminant level purification.

The capacity of the highly selective material required for removal of a desired contaminant depends upon the duration of the removal step and whether or not the active material is to be regenerated or replaced. The duration of the removal step in the process may be quite short (e.g., on the order of seconds) or very long (e.g., hours, days, or more) when the process incorporates a regeneration step. For single-step removal processes where the active material is periodically replaced, the required duration of the removal step may be much longer, e.g. months to several years. It will be appreciated that the more costly the material, the longer the time that is desired between its replacement.

Many contaminants, present at only trace concentrations in a gas stream, may be difficult to remove by adsorption, e.g. $CO$, $H_2$, $N_2O$, $NO_x$, light hydrocarbons and the like. When no appropriate adsorbent is commercially available, an advanced material must be synthesized (if possible) for a specific contaminant removal. Highly selective adsorbents and catalysts may originate from any of the numerous porous materials such as zeolites, activated alumina, activated carbon, silica gel and the like, properly treated as in ion exchange, impregnation, etc. so as to achieve the required selectivity for the desired contaminant. Highly selective adsorbent or catalyst materials can contain elements from Group VIII and/or Group IB of the Periodic Table. Such highly selective materials are either costly to produce and/or contain a significant amount of expensive elements, e.g. Pt, Pd, Ag, Au or the like.

As discussed above, the requirements of high selectivity and relatively low capacity combined with high cost of the material often results in the need for only a relatively thin layer of the active material for the desired removal of the targeted contaminant. For large commercial scale separation processes, the area over which this thin layer must be applied is usually large, for example a twelve-foot diameter adsorbent vessel. When such a layer is required to be only a few centimeters or inches in depth, practical limitations arise in loading such materials into the vessel to achieve a uniform layer depth, i.e. with variations in layer depth of no more than approximately $\pm 10\%$ of the desired depth. For a design requiring only a 5.0 cm layer depth, such practical limitations could therefore result in variations of up to $\pm 50\%$ ($\pm 2.5$ cm). Premature breakthrough of the contaminant could occur in the regions where the local thickness of the installed layer is less than the design depth. When an inexpensive material is used, one solution is to increase the amount of material to such a depth where the variations caused from loading or process operation are not detrimental to the effectiveness of the layer. Such a strategy, however, is quite costly when expensive materials priced at $10/lb or even $100/lb or more are required. This problem is exacerbated by the fact that the length of the mass transfer zone for this type of purification is often greater than the layer depth (i.e. $L_{MTZ} \geq L_{lay}$) required to achieve the desired product purity. Conventional design practice for achieving high adsorbent productivity suggests that the length of the bed or adsorbent layer be several times longer than the MTZ, i.e. $L_{Bed} \geq 2 \times L_{MTZ}$ (Wankat, P. C., Large-Scale Adsorption and Chromatography, Vol. 1, pgs. 59-60, 1986). This insures that the majority of the adsorbent in the bed is saturated with contaminant (as in an equilibrium zone) at the end of the adsorption step. Following such teaching results in a significant increase in the amount of expensive adsorbent used.

In trace contaminant removal, the contaminant concentration is low enough that the time and/or bed length required for establishing an equilibrium zone may be far greater than is practical for the purification process. Purification to achieve high or ultra-high purity product suggests a material of high selectivity, as well as good contaminant loading capacity. In the present invention, it has been discovered that mixing the active material with a second material solves the problem of maintaining an adequate layer thickness without increasing the cost of the expensive material in the layer. However, an unexpected result of such mixing is an increase in the breakthrough capacity of the thicker mixed layer compared to the relatively thinner layer containing only the expensive material of high selectivity. Alternatively, a mixture utilizing a given amount of active material produces a higher purity product than the same amount of active material used alone in a process with the same removal step time. These results are particularly surprising in view of the fact that they are obtained using a contaminant removal layer shorter than the length of the mass transfer zone.

The present invention thus provides for the mixing of an expensive adsorbent or catalyst of high selectivity with an inexpensive inert or material of relatively low selectivity (a "non-selective material") for trace contaminant removal from a gas stream using a relatively thin layer of the mixture to produce a high purity or ultra-high purity product relative to the contaminant removed. The details of the invention will become apparent through the examples presented below.

Commercially available adsorbents, catalysts and other materials were obtained and used in the examples as follows: (1) 13X APG (8×12) zeolite beads (obtained from UOP of Des Plaines, Ill.); (2) Catalyst E221 P/D, 0.5% Pd on aluminum oxide (2 mm-4 mm) beads (obtained from Degussa Corporation, Parsippany, N.J.); (3) F200 (⅛ in beads) activated alumina (obtained from Alcoa, Inc., Pittsburgh, Pa.); and (4) Pyrex® glass beads (3 mm)(cat. no. 7268-3) (obtained from Corning, Inc., Corning, N.Y.). AgX (10×20) beads were produced according to methods described in commonly owned, copending U.S. patent application Ser. No. 11/170,104, filed on Jun. 30, 2005, by Ackley et al. and, entitled "Silver-Exchanged Zeolites and Methods of Manufacture Therefor", the entire contents of which are incorporated herein by reference. AgX represents an expensive adsorbent of high selectivity for a class of contaminants that are favorably removed through the mechanism of π-complexation. One of ordinary skill in the art would appreciate that higher selectivity for such applicable contaminants is achieved in AgX adsorbents that are of higher Ag-exchange level and low moisture content. As a result, the performance of AgX and other applicable adsorbents can be improved by mixing according to the present invention, and such AgX adsorbents would not be limited to only those described in the above cited reference.

The general concept and method of a breakthrough test is known to those skilled in the art. A standard breakthrough test is used to measure the performance of individual adsorbents, catalysts and mixtures thereof. CO and $H_2$ have been selected as reference trace contaminants to demonstrate the fundamental advantages of the present invention. For the purpose of illustrating purification by adsorption and catalysis, adsorption of CO and oxidation of $H_2$ are utilized respectively. The breakthrough or working capacity ($\Delta CO$ or $\Delta X_{CO}$) is determined from an overall mass balance of the CO in the feed and effluent streams at defined CO breakthrough concentrations, e. g. 1.0 ppb, 10.0 ppb, and/or 100.0 ppb. Breakthrough time is also representative of contaminant removal capacity, e.g. for CO, $H_2$, as well as other molecules. The dynamic working capacity of the CO adsorbate simultaneously incorporates coadsorption and kinetic effects inherent in real processes. The CO working capacity has been determined here from the results of a reference breakthrough test conducted after thermal regeneration, i.e. similar to the condition in thermal swing adsorption processes (TSA). Under such conditions Equation (1) represents the CO working capacity:

$$\Delta X_{CO} = \Delta CO = \frac{m_{in}}{w_s} \int_0^{t_b} (y_{in} - y_{out}) dt \tag{1}$$

$m_{in}$ is the molar feed flow into the bed, $y_{in}$ and $y_{out}$ are the inlet and outlet mole fractions of CO, respectively, $w_s$ is the mass of adsorbent and $t_b$ is the breakthrough time corresponding to a predetermined CO breakthrough concentration. Determined with a CO concentration reduction ratio of at least 2.0 ppm/0.1 ppm=20, the working capacity inherently captures the kinetic effects resulting from mass transfer resistance. For purposes of the present invention, the primary component in the feed gas of the breakthrough test is $N_2$. Since the concentration of $N_2$ in the feed stream is overwhelming compared to that of CO, the coadsorption effect of CO upon $N_2$ is negligible. Conversely, the coadsorption of $N_2$ may affect the adsorption of CO. The breakthrough test method as described is preferred for establishing the working capacity for CO since $N_2$ and $O_2$ coadsorption, $H_2$ reduction and mass transfer effects are automatically incorporated in the resultant CO loading. Thus, the CO working capacity and breakthrough time are determined for the adsorbents and mixtures in the presence of such inhibiting factors. One skilled in the art will recognize that the CO breakthrough test described is exemplary, and that similar breakthrough tests can and would be devised to evaluate adsorbents, catalysts and/or mixtures containing such materials for removal of contaminants other than CO using test conditions relevant to the purification process of interest.

The working capacity of CO was determined in this way from a CO breakthrough test used as a reference indicator of the removal effectiveness of the adsorbent or mixture. The conditions of the test were carefully selected to represent adsorption capability under realistic process conditions. The reference breakthrough test is performed at 7.9 bara (114.7 psia), 10° C. and an inlet gas flow rate of approximately 21 slpm (78.7 mol/m²s) using adsorption column lengths varying from 5.9 cm (2.3 in) to 30.5 cm (12.0 in). The feed gas composition (79% $N_2$ and 21% $O_2$) includes trace levels of CO and/or $H_2$ as defined in each example below. Further details of this test are given in PCT patent publication No. WO 03/101587, entitled "Production of High Purity and Ultra-High Purity Gas", the contents of which are incorporated herein by reference. Any variations to these reference conditions are noted in the examples.

The test bed containing the adsorbent, catalyst or mixture is initially thermally activated to remove residual water and/or other adsorbed contaminants. "Activation" is performed using a dry $N_2$ purge flow of 13.6 slpm. The temperature is slowly ramped from ambient to 350° C. and then held at 350° C. overnight. The bed is then cooled (using the same purge) to ambient temperature. Test beds are "regenerated" after breakthrough testing in dry air at a temperature that varies from 175° C. to 275° C. for 2.0 h and cooled in dry $N_2$ for 3.0 h, all at 2.0 slpm. Regeneration removes CO and other impurities adsorbed during the preceding breakthrough test. Irreversible reactions are sometimes observed in the first exposure to the feed, so the first breakthrough test is discarded. The results of the second and subsequent breakthrough tests were found to be reproducible and thus were used to calculate the CO working capacity.

EXAMPLE 1

A AgX (Si/Al =1.25) zeolite adsorbent, tailored for removal of trace concentrations of CO by π-complexation (chemisorption) and produced according to methods prescribed in commonly owned, copending U.S. patent application Ser. No. 11/170,104 by Ackley et al., and entitled "Silver-Exchanged Zeolites and Methods of Manufacture Therefor", was subjected to a breakthrough test as described above. The zeolite used in this example had a Ag-exchange level greater than 85% and a moisture content less than 1.0wt %. The CO capacity of this adsorbent is represented by the performance data in Table 1. The feed gas contained 2.0 ppm CO and 220 ppb H2. A test bed of 5.9 cm length was packed with 11.86 g AgX adsorbent. The average particle size of the AgX is 1.4 mm and its packing density in the test bed is approximately 1.0 g/cc. This bed was tested to CO saturation, i.e. the test was run until the concentration of CO in the effluent (product) reached the CO concentration in the feed (2.0 ppm). A 13X APG 8×12) zeolite (20.13 g) was packed into a test bed 15.2 cm long and subjected to a feed gas containing 2.0 ppm CO and 3.0 ppm $H_2$. The average particle size of the 13X APG is 2.1 mm and its packing density in the test bed is approximately 0.68 g/cc. The results are summarized in Table 1. CO breaks through a 15.2 cm bed containing 13X APG almost immediately. Thus, 13X APG adsorbent shows little or no affinity for CO removal at these trace conditions, i.e. 13X APG is relatively non-selective for CO. Conversely, AgX is highly selective for CO at these conditions and demonstrates both good CO working capacity and substantial breakthrough times for a very short bed at both 10.0 ppb and 100.0 ppb CO breakthrough concentrations.

TABLE 1

Reference CO Working Capacity and Breakthrough Time for AgX and 13X APG Adsorbents

| adsorbent | Bed depth cm | $y_{CO}$ ppm | $y_{H2}$ ppm | $t_b$ @ 100 ppb h | $t_b$ @ 10 ppb h | $\Delta X_{CO}$ @ 100 ppb mmol/g | $(X_{CO})_{sat}$ mmol/g |
|---|---|---|---|---|---|---|---|
| AgX | 5.9 | 2.0 | 0.22 | 9.0 | 5.0 | 0.083 | 0.27 |
| 13X APG | 15.2 | 2.0 | 3.0 | <.02 | — | <0.002 | — |

$(X_{CO})_{sat}$ represents the equilibrium capacity of the adsorbent (0.27 mmol/g) at these conditions. This is the CO loading that adsorbent in an equilibrium zone would have if such a zone exists within the bed at the end of the adsorption step. The CO working capacity ($\Delta X_{CO}$) at a CO breakthrough concentration of 100.0 ppb is less than 31% of this saturation capacity, suggesting the absence of an equilibrium zone of any significant fraction of the overall bed length (5.9 cm).

EXAMPLE 2

Test beds of various lengths (7.6 cm, 10.2 cm, 12.7 cm, 15.2 cm, 17.8 cm and 30.5 cm) were all loaded carefully with uniform AgX/13X APG mixtures. The AgX (10×20) was from the same production batch as that in Example 1. Each of the beds of different length contained essentially the same amount of AgX (11.62±0.24 g). Predetermined volumes of 13×APG (8×12) were mixed uniformly with this fixed amount of AgX so as to fill each bed completely, resulting in a series of beds containing uniform AgX/13X APG mixtures of varying volume ratio. The same 5.9 cm test bed of Example 1 was repeatedly tested and represents 100 vol % AgX.

Each bed was then activated at 350° C. in $N_2$. Breakthrough tests were then conducted with 2.0 ppm CO and 3.0 ppm $H_2$ contained in the feed gas. Test beds were regenerated between breakthrough tests. Activation, regeneration and breakthrough tests were performed as described above. The first breakthrough result of each bed was discarded in order to avoid effects of any irreversible reactions. The breakthrough tests were repeated several times for most of the test beds. All tests were conducted at a feed pressure of 7.9 bara, except that one test of the 10.2 cm bed was performed at 12.25 bara. Otherwise, all test conditions were as described above for the standard reference breakthrough test.

The CO working capacity ($\Delta X_{CO}$), also termed "CO loading", was determined according to Equation 1 above for each test at the CO breakthrough concentrations of 10.0 ppb and 100.0 ppb. These results are shown in FIG. 1, and demonstrate the effects of increasing amounts of 13X APG mixed with a given amount of AgX in the bed. Considering that the 13X APG has negligible capacity for CO at these conditions (as shown in Example 1) and that each bed contains the same mass of AgX, it was unexpected that the CO capacity of the mixture (essentially all CO is adsorbed only on the AgX) increases as more 13X APG is added to the mixture in the bed. The CO loading (at the 100.0 ppb breakthrough condition) for 11.6 g AgX increases from about 0.08 mmol/g AgX for a bed containing only AgX to more than 0.12 mmol/g AgX when this same amount of AgX is mixed with 13X APG so that only about 20% of the total volume is occupied by the AgX. This effect is even more pronounced at the higher purity condition represented by a CO breakthrough concentration of 10.0 ppb. In the latter case, the CO loading for AgX is doubled from 0.04 mmol/g AgX to 0.08 mmol/g AgX by simply increasing the bed length from 5.9 cm to 30.5 cm using the same quantity of AgX mixed uniformly with 13X APG to fill the total bed volume.

This example illustrates that a mixture utilizing a given amount of active material produces a higher purity product than the same amount of active material used alone in a process with the CO removal capacity.

EXAMPLE 3

A computer model was applied to simulate breakthrough tests for the AgX of Example 1 and for the AgX/13X APG mixture (58%/42%) of Example 2. The detailed adsorption model is based upon the governing material and energy balances defining the process. A linear driving force (LDF) sub-model describes the adsorption rate. The bed model is represented by one dimensional plug flow with negligible axial dispersion. Additional characteristics of the model include pressure drop represented by the Ergun Equation and multi-component isotherms. The isotherm for CO/AgX was determined at low partial pressures ($3 \times 10^{-6}$ bara to $8 \times 10^{-5}$ bara) from the saturation end points of breakthrough tests similar to that described in Example 1. Different CO partial pressures were obtained in a series of tests by varying the CO concentration and/or the total pressure in the feed gas. A non-isothermal energy balance was used to account for heat of adsorption and heat transfer effects internal and external to the bed. The breakthrough model is similar to the one described in more detail in U.S. Pat. No. 6,500,234. Such models and their application are familiar to those of ordinary skill in the art.

The simulation of the breakthrough test is used herein to estimate the characteristics of the mass transfer zone. The mass transfer coefficient for CO is adjusted until the simulation and experimental results are in reasonable agreement. Once this is achieved, the simulation yields detailed results such as concentration, loading distributions and other results throughout the adsorbent layer.

Figure 2:
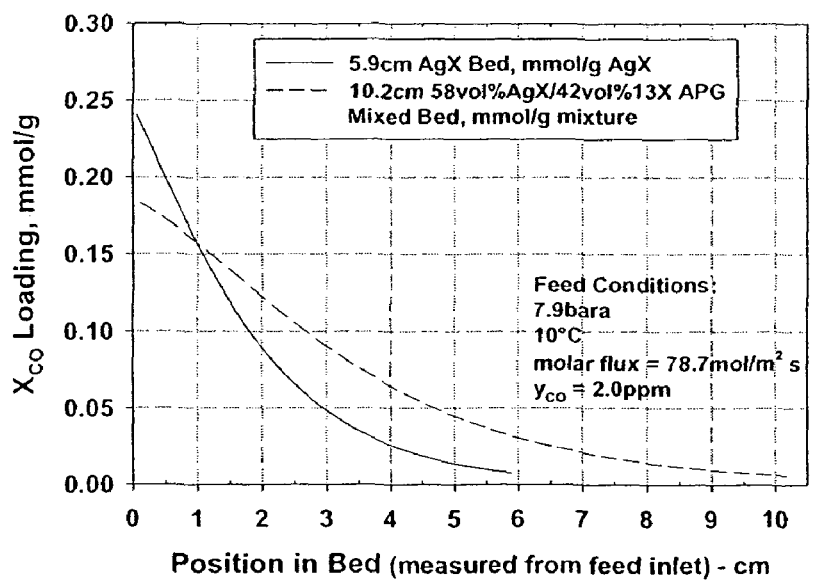
FIG. 2 illustrates the CO loading distribution along the bed length (or depth) at the time of 100.0 ppb CO breakthrough in the effluent relative to Example 3.

The CO loading distribution along the bed length (or depth) at the time of 100.0 ppb CO breakthrough in the effluent was obtained from the simulation of the 5.9 cm AgX test bed as shown in FIG. 2. The corresponding breakthrough time is 8.5 hr and compares to the experimental breakthrough time of 9.0 h in Example 1. Clearly, the CO loading distribution shows only a MTZ and no equilibrium zone (the bed inlet has not even reached the saturation level of 0.27 mmol/g). A CO gas concentration distribution along the bed shows the same pattern. The results of simulation also confirm that the removal of trace CO is essentially isothermal, i.e. the bed remains at a constant temperature.

The computer model was also applied to simulate the CO breakthrough of the 10.2 cm mixed bed of Example 2. This bed contained a uniform mixture of AgX/13X APG in the approximate volume ratio 58% AgX/42% 13X APG. The packed bed density of the mixture was 0.85 g/cc. The isotherm for the mixture was represented by adjusting the AgX isotherm described above to account for the reduced amount of AgX and the difference between densities of the AgX and the mixture, noting that the 13X APG has essentially no CO adsorption capacity at these partial pressures. Thus, at a given CO partial pressure, the equilibrium loading $(X_{CO})_{mix}$ of the mixture is approximated as follows: $(X_{CO})_{mix}=(X_{CO})_{AgX}\times$ (0.58 cc AgX/cc mix)×(cc mix/0.85 g mix)×(1.0 g AgX/cc AgX), where $(X_{CO})_{mix}$ has the units (mmol CO/g mixture) and $(X_{CO})_{AgX}$ has the units (mmol CO/g AgX).

The CO loading distribution along the length of the bed containing the mixture at the time of 100.0 ppb CO breakthrough in the effluent was obtained from the simulation as shown in FIG. 2. The corresponding breakthrough time is 10.0 hr and compares to the experimental breakthrough time of 10.2 h in Example 2. The CO loading distribution in the mixture shows only a MTZ and no equilibrium zone. The CO gas concentration distribution along the bed shows the same pattern.

Comparing the loading distributions in FIG. 2 for AgX adsorbent and the AgX/13X APG mixture, it is clear that the average ΔCO loading is increased for the mixture. The same amount of AgX is contained in both test beds. Note that the ΔCO loading for AgX is given in the units mmol CO/g AgX, while that for the mixture is given in the units mmol CO/g mixture.

Alternate methods may be used to estimate the characteristics of the mass transfer zone or to determine the presence of an equilibrium zone within the bed. The most direct way is to measure the contaminant concentration along the length of the bed at the end of the adsorption step (e.g., as indicated in U.S. Pat. Nos. 3,773,690 and 4,762,537). The presence of an equilibrium zone is characterized by a relatively constant contaminant concentration, such concentration at the same level as that in the feed gas. The MTZ may also be estimated from the breakthrough results (Wankat, P. C., Large-Scale Adsorption and Chromatography, Vol. 1, pgs 50-53, 1986) or from the length of unused bed (LUB) for constant pattern MTZ behavior as described by Ruthven (Principles of Adsorption and Adsorption Processes, pgs. 270-271, 1984).

EXAMPLE 4

Adsorbents were used from the same production lots as those in Example 2. A 10.16 cm long test bed was packed entirely with 20.20 g AgX. A second test bed (20.32 cm in length) was packed with a uniform 50 vol % AgX/50 vol % 13X APG mixture. The amount of AgX contained in the mixture was 20.15 g. The CO concentration in the feed gas was 10.0 ppm and the pressure was 7.9 bara for the breakthrough tests. Otherwise, activation, regeneration and breakthrough tests were conducted the same as described in Example 2. The results of the breakthrough tests are summarized in Table 2.

TABLE 2

| | AgX and AgX/13X APG Mixture Performance at 10.0 ppm CO | | | | | | |
|---|---|---|---|---|---|---|---|
| adsorbent | Bed depth Cm | $t_b$ @ 100.0 ppb h | $\Delta X_{CO}$ @ 100.0 ppb mmol/g | $t_b$ @ 10.0 ppb h | $\Delta X_{CO}$ @ 10.0 ppb mmol/g | $t_b$ @ 1.0 ppb h | $\Delta X_{CO}$ @ 1.0 ppb mmol/g |
| AgX | 10.16 | 5.6 | 0.154 | 4.35 | 0.120 | 3.45 | 0.095 |
| AgX/13X APG 50%/50% | 20.32 | 9.4 | 0.259 | 8.2 | 0.226 | — | — |
| AgX/13X APG 50%/50% | 20.32 | 9.3 | 0.256 | 8.0 | 0.220 | 6.8 | 0.187 |

Note:
feed is at 10° C. and contains 3.0 ppm $H_2$

The results of Examples 1 and 4 show that the ΔCO loading or working capacity of AgX increases with both feed CO concentration and bed depth. The effect of the adsorbent mixture at the higher CO feed concentration and increased amount of AgX is more pronounced, but is consistent with the results of Example 2. The fractional reduction in CO capacity with increasing product purity or decreasing breakthrough concentration for the mixed bed is less than that of the bed containing the same amount of AgX alone.

The results for a CO breakthrough concentration of 1.0 ppb reflect a concentration reduction ratio of 10/0.001=10,000. The effect upon purity and capacity is significant in that the same quantity of AgX mixed 50 vol %/50 vol % with 13X APG can achieve a lower contaminant concentration (1.0 ppb) with a greater dynamic CO capacity (0.187 mmol/g AgX) than that achieved for the unmixed bed (0.154 mmol/g AgX) at 100 ppb CO. The ability of the mixture to extend the capability of the selective adsorbent is particularly important to ultra-high purity applications.

EXAMPLE 5-7

The unexpected advantages of mixing adsorbents may also be captured for catalysts employed for trace gas conversion and removal. These and other advantages are demonstrated in the examples below using a catalyst containing 0.5 wt % Pd supported on activated alumina, referred to hereafter as Pd/$Al_2O_3$. This Pd/$Al_2O_3$ catalyst behaves similarly to an adsorbent in removing $H_2$, i.e. $H_2$ breaks through in a finite time. This behavior is in contrast to ideal catalysis where $H_2$ would be oxidized to $H_2O$ indefinitely. Since no $H_2O$ emerges from the catalyst bed during this oxidation, it is believed that the water vapor oxidation product is adsorbed on the support (activated alumina) of the catalyst. Furthermore, it also believed that the $H_2$ breakthrough occurs as a result of the deactivation of the Pd as $H_2O$ vapor is adsorbed and finally accumulates to the point of interfering with the oxidation of $H_2$ on the Pd sites. This deactivation is reversible through the thermal regeneration of the catalyst, although the regeneration temperature affects the "regenerated capacity" of the catalyst. The $H_2$ breakthrough times, determined at $H_2$ breakthrough concentrations of 20.0 ppb and 100.0 ppb, are used in place of a "working capacity" of the catalyst or mixture. The $H_2$ breakthrough tests are carried out using the same apparatus and in a manner similar to that described above for CO. Initial activation is performed at 350° C. in dry $N_2$ as described above for adsorbents. Regeneration is performed also as described above for adsorbents except that the temperature is controlled at a constant 177° C. during the 2.0 h hot purge step in air. Results are compared for breakthrough tests conducted after both activation and regeneration conditions.

EXAMPLE 5

Catalyst E221 (Pd/$Al_2O_3$, with an average particle diameter of 3.4 mm) (from Degussa, Corporation), F200 activated alumina (from Alcoa, Inc.) and Pyrex® glass beads (from Corning, Inc.) were each packed into test beds of 15.24 cm length. Breakthrough tests were conducted at feed conditions of 3.0 ppm $H_2$, 9.63 bara, 10° C., an inlet gas flow rate of approximately 21 slpm (78.7 mol/m²s) with 79% $N_2$ and 21% $O_2$ and otherwise as described above. CO was also present at 2.0 ppm in the feed gas for the glass bead breakthrough test only, all other tests in this example did not contain CO in the feed gas. The resultant breakthrough times for $H_2$ breakthrough concentrations of 20.0 ppb and 100.0 ppb are shown in Table 3.

These results represent the performance of the E221 catalyst alone at these conditions and for a bed depth of 15.24 cm. There is a difference in $H_2$ removal breakthrough time of nearly a factor of two, depending upon whether the catalyst is activated at 350° C. in a high flow of dry $N_2$ overnight or regenerated in dry air at low flow for a shorter time. As expected, the $H_2$ breakthrough time is considerably longer for the higher breakthrough concentration (100.0 ppb $H_2$). Neither the F200 activated alumina nor the glass beads demonstrate any ability to remove $H_2$, that is they are non-selective materials relative to $H_2$ removal. The material weight given in Table 3 is that determined after thermal activation or regeneration.

TABLE 3

Summary of E221 Catalyst, F200 Activated Alumina and Glass Beads in Trace $H_2$ Removal

| Bed Config. | Bed Length cm | Regenerate or activate | Regen or act. Flow slpm | Material wt G | t @ y$H_2$ = 20 ppb h | t @ y$H_2$ = 100 ppb h |
|---|---|---|---|---|---|---|
| E221 | 15.24 | 350° C., $N_2$ overnight | 13.6 | 19.866 | 9.8 | ≈16 |
| E221 | 15.24 | 177° C., air, 2 h Cool $N_2$, 3 h | 2 | 19.934 | 4.8 | ≈8 |
| E221 | 15.24 | 177° C., air, 2 h Cool $N_2$, 3 h | 2 | 19.966 | 4.5 | 7.6 |
| glass beads | 15.24 | 350° C., $N_2$ overnight | 13.6 | 38.825 | immediate | immediate |
| F200 | 15.24 | 350° C., $N_2$ overnight | 13.6 | 21.259 | immediate | immediate |

EXAMPLE 6

A volume of catalyst E221(20.369 g) (obtained from Degussa, Corporation) equal to that required to fill a 15.24 cm depth test bed was taken from the same production lot as that in Example 5, uniformly mixed with glass beads and packed into a 30.48 cm test bed. The actual dry weight of the E221 was not obtained since the materials were activated after mixing. The E221 contained about 2.0% to 3.0% adsorbed moisture prior to activation, so its dry weight is essentially equal to that of the E221 sample in Example 5. The resultant mixture is approximately an equal volume mixture of the two materials, i.e. 50 vol %/50 vol % E221/glass beads. The breakthrough tests were conducted using the same conditions as in Example 5. $H_2$ breakthrough test results are summarized in Table 4. Comparing these results for the mixture with those for the E221 catalyst alone in Example 5 shows a significant performance enhancement as a result of mixing the catalyst with an essentially inert material. After regeneration, the $H_2$ breakthrough time for the mixture is 8.6 h and 12.5 h for $H_2$ breakthrough concentrations of 20.0 ppb and 100.0 ppb $H_2$, respectively. Breakthrough times at these same $H_2$ breakthrough concentrations for essentially the same amount of catalyst used alone in the shorter bed are only 4.5 h and 7.6 h, respectively. The breakthrough time of the mixture at a $H_2$ breakthrough concentration of 20.0 ppb exceeds that of the same amount of E221 alone for a $H_2$ breakthrough concentration of 100.0 ppb. This again emphasizes the affect the mixture has upon enabling a given quantity of adsorbent or catalyst to be reconfigured (as in a mixture) to achieve a higher purity product or greater removal efficiency.

Characteristic times for various dispersion mechanisms were estimated to investigate the effects of mixing adsorbents and/or catalysts upon the removal of trace contaminants. Parameters defining the characteristic times for axial dispersion, external film resistance and macropore diffusion can be found in standard texts on adsorption, e.g. Ruthven (Principles of Adsorption and Adsorption Processes, chapter 8, 1984). Radial dispersion can be estimated, for example, by the methods provided by Schnitzlein (Chem. Eng. Sci., 56, pp. 579-585, 2001). The axial dispersion ($D_L$), external film ($k_f$) and radial dispersion ($D_r$) coefficients required to esti-

TABLE 4

Summary of Results for 50 vol %/50 vol % Mixture of E221 Catalyst with Glass Beads

| Bed Config. | Bed Length Cm | Regenerate or activate | Regen or act. Flow slpm | material wt g | t @ $yH_2$ = 20 ppb h | t @ $yH_2$ = 100 ppb h |
|---|---|---|---|---|---|---|
| E221/glass beads 50/50 vol % | 30.48 | 350° C., $N_2$ Overnight | 13.6 | 58.993 (20.369) | 14.0 | 21.5 |
| E221/glass beads 50/50 vol % | 30.48 | 177° C., air, 2 h Cool $N_2$, 3 h | 2 | 59.066 | 8.6 | 12.5 |

EXAMPLE 7

The catalyst E221(19.866 g) and activated alumina F200 (21.259 g) used in Example 5 were removed from the 15.24 cm beds and uniformly mixed before packing into a 30.48 cm long test bed. The resultant mixture is approximately an equal volume mixture of the two materials, i.e. 50 vol %/50 vol % E221/F200. The mixture density was slightly higher than that of the individual materials, so an additional 1.57 g of E221catalyst was added to the top (product end) of the 30.48cm bed.

$H_2$ breakthrough tests were conducted using the same conditions as in Example 5. $H_2$ breakthrough test results are summarized in Table 5. Comparing these results for the mixture with those for the E221 catalyst alone in Example 5 and those of the E221/glass beads mixture of Example 6, show significant performance enhancements over both cases as a result of mixing the catalyst with F200 activated alumina. The additional performance gained over the mixture with glass beads is believed to be due to the additional water removal capacity contributed by the added alumina in the mixture. As a result, the catalyst life is further extended. Thus, mixing the catalyst with alumina provides a dual functionality benefit, i.e. one derived directly from an increase in bed length, and that from the extension of the oxidation product ($H_2O$) removal afforded by the additional alumina.

mate characteristic times are determined from correlations described in the references cited above. The macropore diffusivity ($D_p$) was estimated from the results of the simulation in Example 3 above using a method described in U.S. Pat. No. 6,500,234. The characteristic times estimated for various dispersion types are summarized in Table 6. These results confirm that macropore diffusion represents the rate-limiting step for adsorption in such trace gas removal processes, i.e. as would be expected for large pore zeolites and molecules such as $N_2$, $O_2$, $CO_2$, CO and the like.

For the column or bed length of 5.9 cm, 7.9 bara pressure and the molar flux of 78.7 mol/m$^2$ s in Example 1, the interstitial velocity (v) is 0.64 m/s (for a nominal bed void fraction $\epsilon$=0.37). The resulting bed residence time (bed length (or depth) divided by interstitial velocity) for gas molecules passing through the bed is 0.092 s. Thus, the bed residence time for the 5.9 cm bed depth at these conditions is shorter than the characteristic time for the rate-limiting step of pore diffusion (0.15 s). This is a reasonable indication that the bed is dominated by the mass transfer zone, as determined at the end of adsorption for low breakthrough concentration levels (ppb). The bed length and residence time are doubled by mixing equal volumes of selective material with another material, although the volume fraction of selective adsorbent or catalyst particles is halved. At first glance, one might expect these two factors to cancel each other. One might also expect the

TABLE 5

Summary of Results for 50 vol %/50 vol % Mixture of E221 Catalyst with Activated Alumina

| Bed Config. | Bed Length Cm | Regenerate or activate | Regen or act. Flow slpm | material wt g | t @ $yH_2$ = 20 ppb h | t @ $yH_2$ = 100 ppb h |
|---|---|---|---|---|---|---|
| E221/F200 50/50 vol % | 30.48 | 350° C., $N_2$ overnight | 13.6 | 42.13 | 18.4 | 25.4 |
| E221/F200 50/50 vol % | 30.48 | 177° C., air, 2 h Cool $N_2$, 3 h | 2 | 42.25 | 10.8 | 14.9 | mixture to result in an earlier breakthrough since inactive particles dilute the selective adsorbent or catalyst and may reduce the overall exposure of selective material to the contaminant molecules. While not wanting to be bound by any particular theory, it is believed that increasing the residence time by increasing the bed length using a mixture actually increases the exposure of selective adsorbent and/or catalyst particles to the contaminant molecules of interest due in part to the effects of radial dispersion.

TABLE 6

Characteristic Times of Various Dispersion Mechanisms Present in Adsorption Processes

| Dispersion | Parameter | Characteristic Time (seconds) |
| --- | --- | --- |
| Axial | $\dfrac{D_L (1 - \varepsilon)}{v^2 \varepsilon}$ | $3.7 \times 10^{-3}$ |
| External film | $\dfrac{r_p}{3k_f}$ | $1.0 \times 10^{-2}$ to $3.0 \times 10^{-2}$ |
| Radial | $\dfrac{D_r (1 - \varepsilon)}{v^2 \varepsilon}$ | $1.4 \times 10^{-4}$ |
| macropore diffusion | $\dfrac{r_p^2}{D_p}$ | 0.15 |

$r_p$ is the adsorbent particle radius

Radial dispersion represents the motion of gas molecules perpendicular to the axis of flow of gas through the bed in a radial direction relative to the flow axis. The characteristic time for radial dispersion shown in Table 6 is very short and establishes the distance off the stream axis that a molecule could travel in this time. The effect can be visualized by considering a streamline of gas molecules (feed gas) entering a localized point at the bed inlet. If there were no radial dispersion, then these molecules would move straight through the bed in a "plug-flow" manner. Due to radial dispersion, molecules entering the bed at the "point source" at the inlet may not follow a straight path through the layer but will be dispersed within a boundary defined by the volume of a cone. The vertex of the cone represents a point source at the bed inlet. The diameter of the base of the cone is defined by the degree of radial dispersion that occurs as the gas molecules traverse the entire length of the bed (cone height). If a bed of given length is then doubled by mixing the selective adsorbent with another material of equal volume the residence time doubles and the volume fraction of selective adsorbent is halved. Thus in plug flow, the residence time and volume fraction effects cancel each other. The exposure volume increases, however, by a factor of eight due to radial dispersion when the bed depth is doubled, i.e. when the cone height is doubled. Even though the population density of selective material is halved in this larger volume due to mixing, the exposure of contaminant gas molecules to selective material is considerably amplified due to the effect of radial dispersion resulting from lengthening the bed. The use of a mixture here avoids increasing the amount of expensive material to achieve an equal or better level of trace contaminant removal.

The present invention applies to the use of expensive and highly selective adsorbents and catalysts for trace contaminant gas removal to generate products of high and ultra-high purity. Unexpectedly, mixing such highly selective materials with other less expensive materials results in the ability to achieve higher purity, higher capacity and/or lower cost without adding additional expensive selective material.

The invention generally applies to purification of gas streams wherein any single or multiple contaminants to be removed are present each in a concentration no greater than 1000 ppm. The highly selective materials used in this invention are likely to contain at least one element from Group VIII or Group 1B of the Periodic Table. Conditions of the process, the product purity requirements, characteristics of the highly selective material and contaminant often result in a length or depth of adsorbent or catalyst that is equal to or less than the mass transfer zone length. When such conditions exist, performance may be improved by increasing the layer or bed length by mixing. The original amount of highly selective material is mixed with another adsorbent, catalyst or inert material that is usually less expensive and much less selective than the highly selective and expensive material.

The mixed layer of the present invention may be used as the sole purification means for a gas stream or may be one of several layers within an adsorption or reaction vessel designed to remove multiple contaminants from a gas stream. Such mixed layers may also be configured within a vessel designed for axial flow, radial flow or lateral flow or the like. Purification processes incorporating such mixed layers are not restricted to any particular set of process temperatures or pressures except as limited by the characteristics of the materials themselves. A purification process may be defined by a single adsorption or reaction step such that the highly selective material is periodically replaced. Alternatively, the process may incorporate a regeneration step. A thermal swing regeneration process, such as thermal swing adsorption, will provide the most complete regeneration of the highly selective adsorbent or catalyst. However, PSA, VSA, displacement desorption and combinations of all of these are within the scope of the invention.

It is further contemplated that multiple trace contaminants could also be removed by mixing two or more highly selective materials together in a single layer in place of using separate layers of these materials or layers of their mixtures with other relatively non-selective materials. In this manner, a first highly selective material for contaminant A (and relatively non-selective for contaminant B) serves as the diluent for the second highly selective material for contaminant B. Likewise, the second highly selective material (and relatively non-selective for contaminant A) acts as the diluent in a mixture with the first highly selective material selective for contaminant A. The effective depth of each material is increased using a single layer and without adding any other materials to the admixture.

Figure 3:
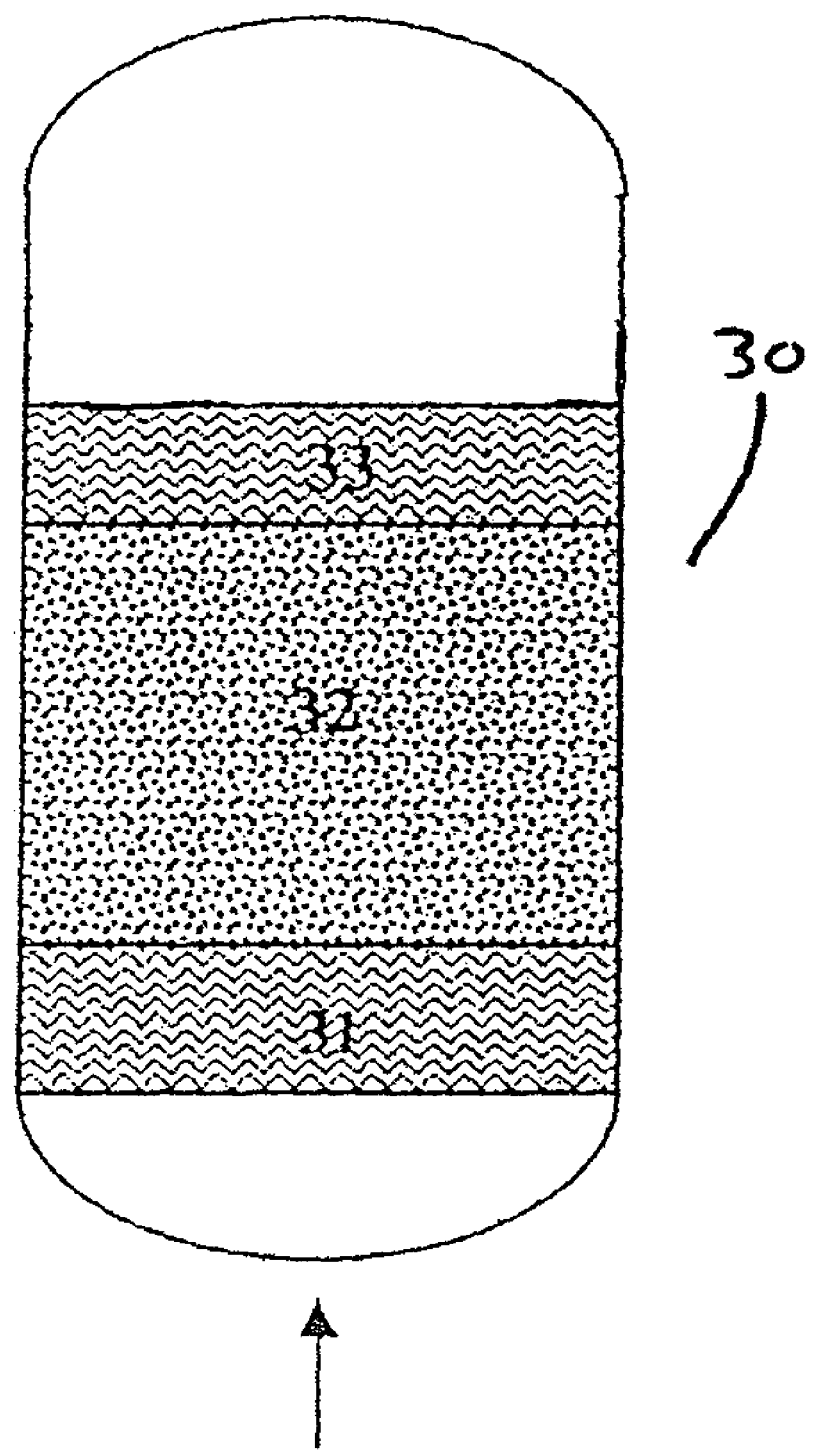
FIG. 3 is a schematic diagram of an exemplary adsorbent arrangement in an adsorbent vessel/bed in accordance with the present invention.

The present invention can be used in a TSA adsorber and system for the removal of CO concentration and, optionally the removal of one or more of: $H_2O$, $CO_2$, and $H_2$ from an incoming feed stream. An exemplary vessel design suitable for removal of CO and optionally, other contaminants, is described below with reference to FIG. 3. The arrow as shown in FIG. 3 indicates the direction of gas flow through the adsorber bed/vessel during the purification step of the process. A TSA prepurifier system incorporating such a vessel is disclosed below with reference to FIG. 4.

Referring again to FIG. 3, vessel 30 is shown. Vessel 30 optionally contains a first layer of $H_2O$ adsorbent (31) such as alumina, silica gel or molecular sieve or mixtures thereof to remove substantially all of the H₂O entering vessel 30. A second layer (32) of CO₂ adsorbent such as 13X APG (NaX) or 5A or mixture of these is optionally used to remove substantially all of the CO₂. The CO₂ adsorbent layer can also remove any residual water remaining from the H₂O adsorbent layer (31). A third layer (33) which is a mixture layer as described hereinabove is placed downstream of the CO₂ adsorbent. (By the term "downstream", it is meant closer to the effluent or product end of the adsorber vessel.) It will be appreciated by those skilled in the art that vessel 30 can be used with adsorbent layer 33 alone. A substantially H₂O-free and CO₂-free gas stream enters layer 33.

It will be appreciated that additional layers above layer 33 or below layer 31 can be added for adsorption or catalysis as shown in PCT publication No. 03/101587, entitled "Production of High Purity and Ultra-High Purity Gas".

In accordance with the present invention, existing prepurifiers can be easily retrofitted using the mixture layers of the present invention. An illustrative process is described herein with reference to FIG. 4. Feed air is compressed in compressor 70 and cooled by chilling means 71 prior to entering one of two adsorbers (76 and 77) where at least the contaminants H₂O, CO₂ and CO are removed from the air. The adsorbers 76 and 77 each have the same adsorbent bed configuration, which may, for example be one as described with reference to FIG. 3 above. The purified air exits the adsorber and then enters the air separation unit (ASU) where it is then cryogenically separated into its major components N₂ and O₂. In special designs of the ASU, Ar, Kr and Xe may also be separated and recovered from the air. While one of the beds is adsorbing the contaminants from air, the other is being regenerated using purge gas. A dry, contaminant-free purge gas may be supplied from the product or waste stream from the ASU or from an independent source to desorb the adsorbed contaminants and thereby regenerate the adsorber and prepare it for the next adsorption step in the cycle. The purge gas may be N₂, O₂, a mixture of N₂ and O₂, air or any dry inert gas. In the case of thermal swing adsorption (TSA), the purge gas is first heated in heater 82 prior to being passed through the adsorber in a direction countercurrent to that of the feed flow in the adsorption step. TSA cycles may also include a pressure swing. When only pressure swing adsorption (PSA) is utilized, there is no heater.

Figure 4:
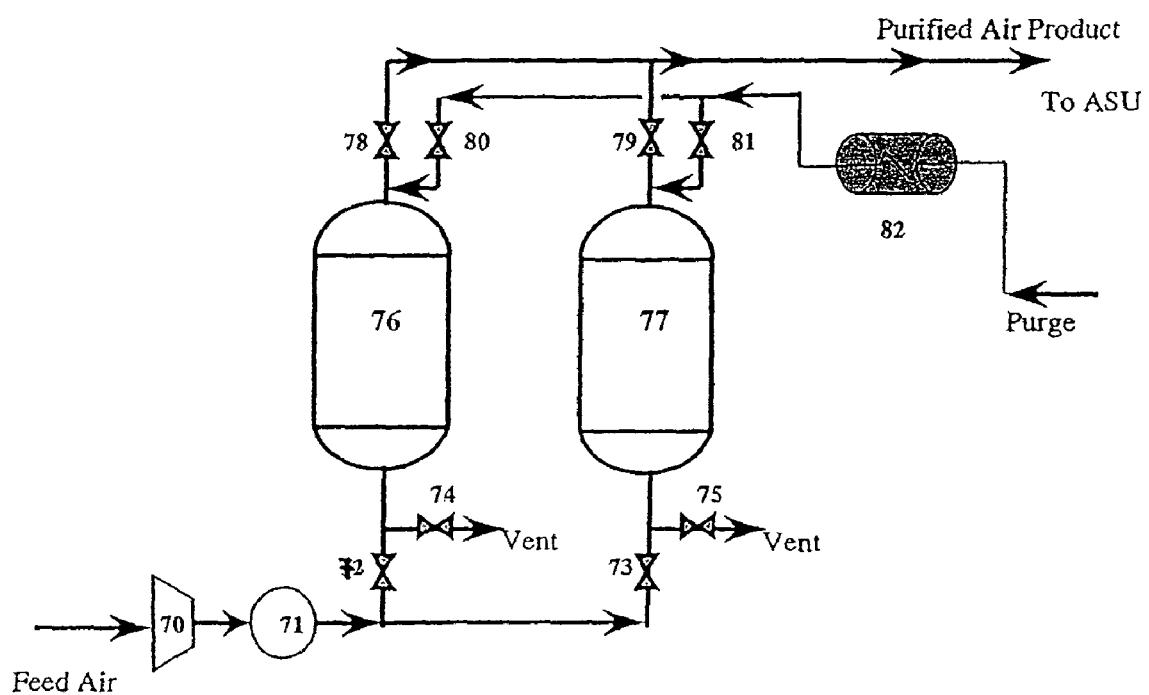
FIG. 4 is a schematic diagram of a prepurification apparatus suitable for use in accordance with the present invention.

The operation of a typical TSA cycle is now described in reference to FIG. 4 for one adsorber 76. One skilled in the art will appreciate that the other adsorber vessel 77 will operate with the same cycle, only out of phase with the first adsorber in such a manner that purified air is continuously available to the ASU. The operation of this out-of-phase cycle is indicated with reference to the numbers in parentheses.

Feed air is introduced to compressor 70 where it is pressurized. The heat of compression is removed in chilling means 71, e.g. a mechanical chiller or a combination of direct contact after-cooler and evaporative cooler. The pressurized, cool and H₂O-saturated feed stream then enters adsorber 76 (77). Valve 72 (73) is open and valves 74 (75), 78 (79) and 80 (81) are closed as the adsorber vessel 76 (77) is pressurized. Once the adsorption pressure is reached, valve 78 (79) opens and purified product is directed to an ASU for cryogenic air separation. When the adsorber 76 (77) has completed the adsorption step, valves 78 (79) and 72 (73) are closed and valve 74 (75) is opened to blow down the adsorber 76 (77) to a lower pressure, typically near ambient pressure. Once depressurized, valve 80 (81) is opened and heated purge gas is introduced into the product end of the adsorber 76 (77). At some time during the purge cycle, the heater is turned off so that the purge gas cools the adsorber to near the feed temperature or optionally, the cool purge is provided directly to the vessel through a bypass.

One of ordinary skill in the art will further appreciate that the above description represents only an example of a typical prepurifier cycle, and there are many variations of such a typical cycle that may be used with the present invention, for example as shown in PCT publication No. 03/101587.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A purification process for a feed gas stream containing at least one contaminant in which the at least one contaminant in the feed gas stream has a concentration of ≦1000 ppm, the process comprising:
   passing the feed gas stream through a layer containing a mixture layer comprising a selective material for removal of the at least one contaminant and a less selective material having a lower selectivity toward the at least one contaminant relative to the selective material;
   wherein the mixture layer has a thickness dimension ($L_{ML}$) in a direction of the feed gas stream flow of the mixture layer, the ($L_{ML}$) being less than or equal to a length of a fully developed mass transfer zone ($L_{MTZ}$) at the end of the adsorption step, in which the $L_{MTZ}$ is defined by conditions of the process and the selective material; and
   wherein the removal of the at least one contaminant results in a purified product containing the at least one contaminant at a concentration ≦1 ppm.

2. The process of claim 1, wherein the selective material comprises a catalyst.

3. The process of claim 2, wherein the selective material contains at least one element from Group VIII or Group IB of the Periodic Table.

4. The process of claim 1, wherein the selective material comprises an adsorbent.

5. The process of claim 4, wherein the selective material contains at least one element from Group VIII or Group IB of the Periodic Table.

6. The process of claim 5, wherein the selective material contains Ag.

7. The process of claim 1, wherein the less selective material comprises a porous material.

8. The process of claim 1, wherein the less selective material comprises a non-porous material.

9. The process of claim 1, wherein the less selective material comprises an inert material.

10. The process of claim 1, wherein the purified product contains the at least one contaminant at a concentration ≦100 ppb.

11. The process of claim 1, wherein the purified product contains the at least one contaminant at a concentration ≦10 ppb.

12. The process of claim 1, wherein the at least one contaminant in the feed gas stream has a concentration of ≦1000 ppm.

13. The process of claim 1, wherein the at least one contaminant in the feed gas stream has a concentration of ≦100 ppm.

14. The process of claim 12, wherein the at least one contaminant in the feed gas stream has a concentration of $\leqq 10$ ppm.

15. The process of claim 1, wherein the at least one contaminant has a concentration ratio of contaminant concentration in the feed gas stream to the purified product in a range of from 10 to $10^5$.

16. The process of claim 1, wherein the at least one contaminant has a concentration ratio of greater than $10^5$.

17. The process of claim 1, wherein the selective material contains at least one element from Group VIII or Group IB of the Periodic Table.

18. The process of claim 1, wherein the mixture contains 10-80 volume % of the selective material.

* * * * *